Oct. 23, 1956  B. J. CHIAMBRETTI  2,767,507
BAIT MINNOW DISPENSERS
Filed Sept. 22, 1954  2 Sheets-Sheet 1
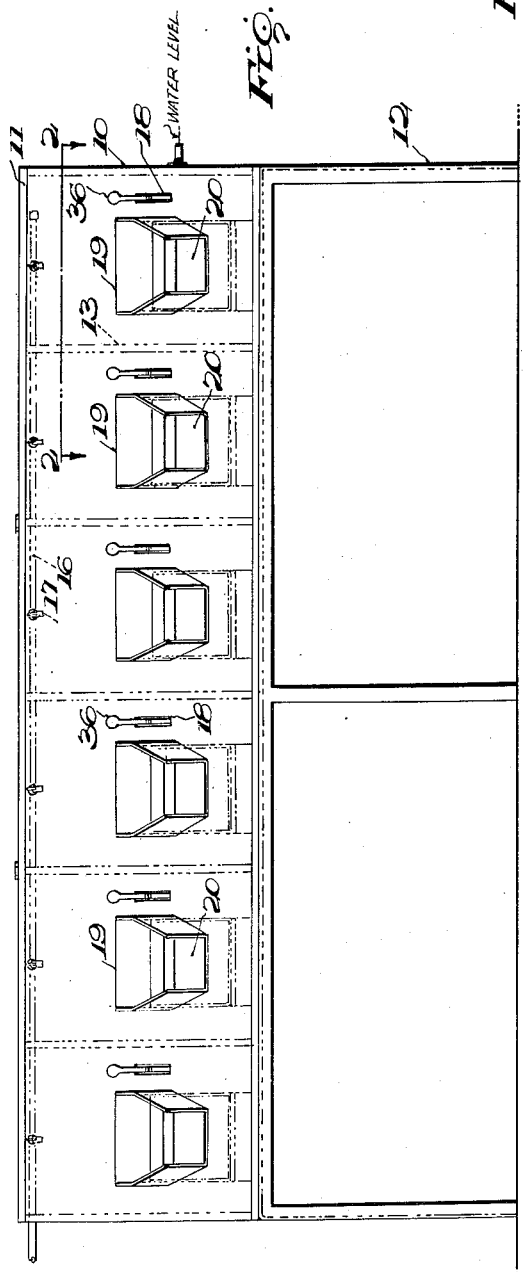
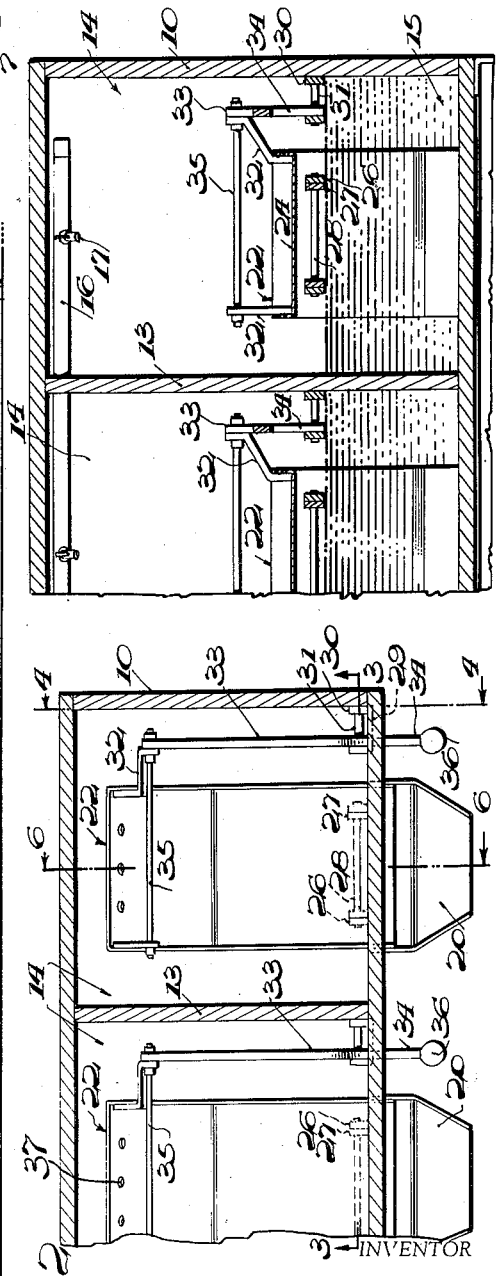
INVENTOR
Battista J. Chiambretti
BY Thos. H. Johnston
ATTORNEY Oct. 23, 1956   B. J. CHIAMBRETTI   2,767,507
BAIT MINNOW DISPENSERS Filed Sept. 22, 1954   2 Sheets-Sheet 2

INVENTOR
Battista J. Chiambretti
BY Thos. K. Johnston
ATTORNEY

United States Patent Office 2,767,507
Patented Oct. 23, 1956

2,767,507

BAIT MINNOW DISPENSERS

Battista J. Chiambretti, Bessemer, Mich.

Application September 22, 1954, Serial No. 457,678

7 Claims. (Cl. 43—55)

This invention relates to dispensers, and more particularly to an improved device for dispensing minnows as used for bait by fishermen.

As will be appreciated, one fisherman may desire bait minnows of one kind, and another fisherman may desire minnows of a different kind, while each may have a preference as to the approximate size of minnows desired. It is accordingly an object of the present invention to provide a dispenser embodying a series of dispensing units adapted to contain minnows of different kinds and sizes so that a fisherman may have opportunity to exercise a choice as to the minnows to be obtained.

A further object of the invention is to provide a dispenser wherein each of the dispensing units of the device will embody a tank to contain a quantity of water, wherein a minnow container will be housed in each tank and will normally have a portion thereof submerged, so that the minnows in the container may swim about within the container in the water of the tank, and wherein the container may be manually tilted to dispense a number of minnows therefrom.

Another object of the invention is to provide a dispenser wherein the dispensing container of each unit will embody a bottom pan which will serve, when the container is tilted, to discharge a quantity of water, along with the minnows, into a bait bucket or the like, so that the minnows will not be injured when being dispensed, and wherein the container, when manually released, will automatically return to its original position within the tank.

And the invention has, as a still further object, to provide a dispenser wherein each of the tanks may be replenished with water individually.

Other and incidental objects will appear as the description of the invention proceeds, and in the drawings:

Figure 1 is a front elevation of my improved minnow dispenser.

Figure 2 is a fragmentary horizontal section on the line 2—2 of Figure 1.

Figure 3 is a fragmentary vertical section on the line 3—3 of Figure 2.

Figure 4:
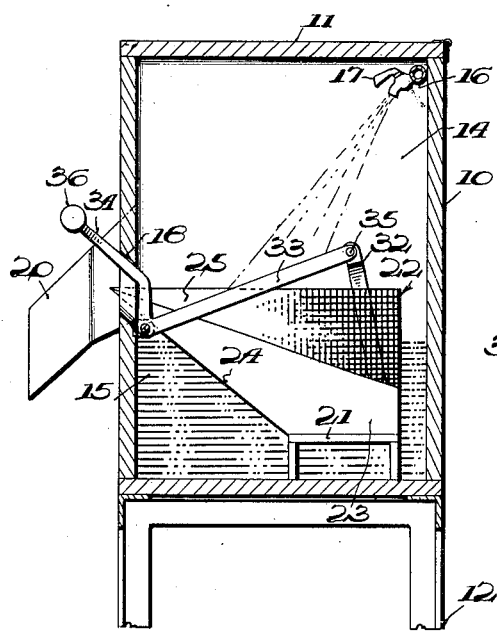
Figure 4 is a transverse vertical section on the line 4—4 of Figure 2.

Referring now more particularly to the drawings, I employ an oblong casing 10 rectangular in cross section, and normally closing the casing is a lid 11 preferably hinged to the casing. The casing may be of wood, metal, or other approved material but, in any event, is constructed to hold water. Supporting the casing is an appropriate stand 12.

Extending transversely within the casing are parallel partitions 13 dividing the casing into a number of dispensing units 14, and as will now be understood from the foregoing, each of said units will comprise a tank 15 adapted to hold water. The length of the casing 10 will be largely determined by the number of dispensing units which it may be desired to incorporate therein. In the present instance, I have shown six of said units, but the number may be varied. Furthermore, in the present instance, I have shown the partitions 13 equally spaced, so that the tanks 15 are all of the same size. However, as will be readily appreciated, the spacing of the partitions 13 may be varied, if so desired, to provide tanks of different sizes for different sized minnows, the reason being, of course, that larger minnows may require a larger quantity of water to keep them alive.

Suitably secured to the back wall of the casing 10 near the upper edge of said wall is a pipe 16 which extends horizontally through the partitions 13 and, at one end, may be appropriately connected with a suitable source of water supply. The pipe 16 carries a number of pet-cocks 17, one for each of the units 14, so that the tank 15 of each unit may, when so desired, be readily replenished with water individually.

The dispensing units 14, except for possible variation in width, as heretofore noted, of the minnow containers therein, as will be later described, are substantially identical. A further description of one of said units will therefore suffice for all, the end unit as seen at the right of Figure 1 of the drawings being chosen. However, corresponding reference numerals will be applied to like parts of all of said units.

Referring now more particularly to the end unit noted, it will be observed that the front wall of the casing 10 is provided near one side of said unit with a vertical slot 18. The height of this slot determines the maximum depth of water in the tank 15 of said unit, and, normally, said tank is kept filled with water up to a level near the lower end of said slot. Formed in the front wall of the casing 10 adjacent the slot 18 is a horizontally extending rectangular discharge opening 19, and fixed to said wall to incline downwardly from the opening 19 is a tapered discharge chute 20, the bottom wall of which is angled at its rear end portion to rest against the lower edge of said opening while the side walls of the chute straddle the opening to fit within the ends thereof.

Disposed within the tank 15 of the dispensing unit is a suitable stool 21 which provides a seat raised above the bottom of said tank, and normally resting upon said seat is a minnow container 22. This container is more or less rectangular in general outline and is formed with a bottom pan 23 of suitable sheet metal or the like. As will be observed, the bottom wall of the pan is inclined upwardly for the greater portion of the length of the pan to provide the sloping bottom wall of a discharge spout 24, while the side walls of said pan are tapered from the rear end wall of the pan to the lip of said spout. Above the pan 23, the side walls of the container as well as the rear end wall thereof are provided with reticulate portions 25 of suitable wire mesh, the recticulate portions of the side walls being tapered to the lip of the spout 24.

Projecting inwardly from the inner side of the front wall of the casing 10 near the lower edge of the opening 19 is a pair of spaced hinge lugs 26, and extending downwardly from the bottom wall of the spout 24 of the container 22 is a similar pair of spaced hinge lugs 27 mating with the lugs 26. Extending through said pairs of lugs is a hinge rod 28 pivotally mounting the container for swinging movement, and, as will be observed, the tip of the spout 24 is disposed to project through the opening 19 into the chute 20 of the unit.

Suitably mounted against the inner side of the front wall of the casing 10 in lateral spaced relation with respect to the container 22, as perhaps best seen in Figure 2 of the drawings, is a more or less U-shaped hinge bracket 29 having spaced ears 30, and extending through said ears is a hinge rod 31 aligning with the hinge rod 28 of the container. Fixed to the side walls of the container near the rear ends of said walls are upstanding posts 32, one of which is offset to extend upwardly at the adjacent side of the container, and pivoted upon the rod 31 is a bellcrank having a long arm 33 and a short arm 34. The long arm 33 extends rearwardly at the adjacent side of the container 22 and is connected with the posts 32 by a pivot rod 35 extending through said posts, while the short arm 34 of the bell-crank projects upwardly through the slot 18 in the front wall of the casing 10 and is provided with a knob 36. As will be perceived, the knob 36 may be grasped for manually operating the bell-crank to raise the container 22 to the position shown in Figures 5 and 7 of the drawings, when the spout 24 of said container will be inclined downwardly to rest the tip of the spout flat against the angular rear end portion of the bottom wall of the chute 20 of the unit for discharge into said chute.

In use, the tanks 15 of the several units 14 are first filled with water up to a level near the lower ends of the slots 18 in the front wall of the casing 10, when the minnows to be dispensed are placed in the several containers 22, and since the containers normally rest upon the stools 21, water in the tanks will enter the containers through the reticulate portions 25 of the walls thereof to fill the bottom pans 23 of the containers. Thus, the minnows in the containers may swim about within said containers in the water of the tanks, but since the walls of the containers, in the normal position of said containers, extend well above the surface of the water in the tanks, the minnows will be prevented from escaping from the containers. In the present instance, I have shown the containers 22 as being all of the same width. However, in any instance where one or more of the units 14 is constructed wider than the others to increase the capacity of the tanks 15 of said wider units, as previously noted, the containers 22 of the wider units may be constructed correspondingly wider to contain minnows larger than those placed in the other containers. As will be understood, minnows of one kind may be placed in one container, and minnows of another kind placed in another container, and so on, while large minnows may be placed in still another container, and very small minnows in yet another container, and so on. Thus, a fisherman will be afforded a choice as to the kind and size of minnows to be obtained.

Figure 5:
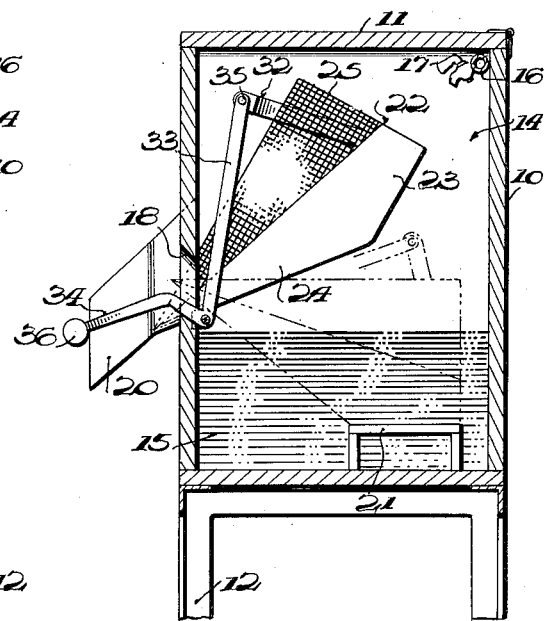
Figure 5 is a view similar to Figure 4 but showing the minnow container raised to tilted dispensing position.
Figure 6:
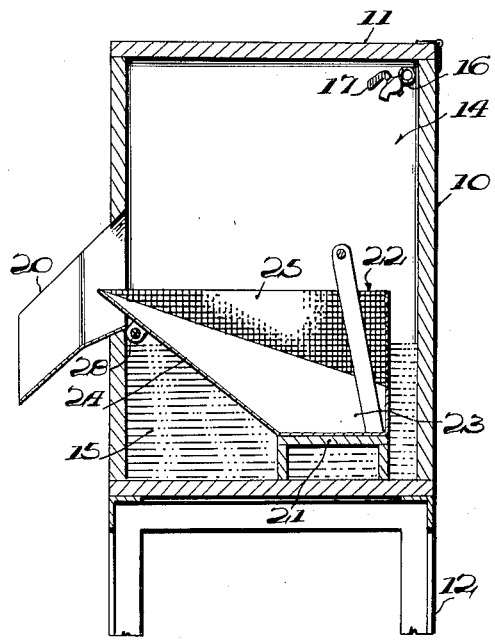
Figure 6 is a transverse vertical section on the line 6—6 of Figure 2.
Figure 7:
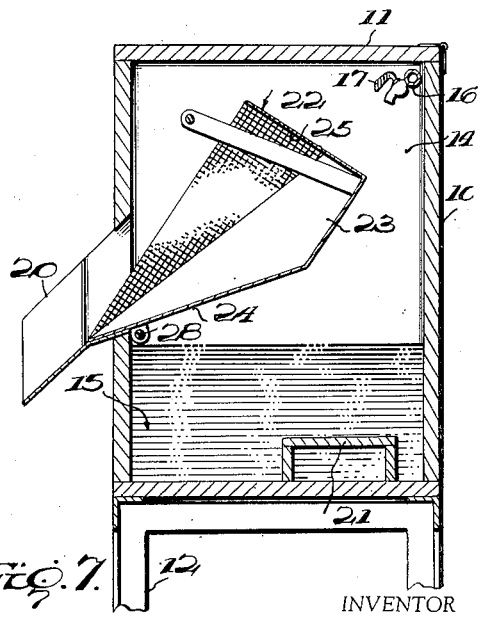
Figure 7 is a view similar to Figure 6 but showing the minnow container raised to tilted dispensing position.

As will now be seen, the openings 19 in the front wall of the casing 10 will normally provide sight openings through which the minnows in the containers 22 of the several units 14 may be observed, so that a fisherman may select the particular minnows desired. Having done so, he may then pull on the knob 36 of the bell-crank of the unit chosen for rocking the arm 34 downwardly and raising the container 22 of said unit, as previously described, to dispensing position, as seen in Figures 5 and 7 of the drawings, when the water in the bottom pan 23 of the container along with the minnows in the container will be caused to gravitate through the spout 24 of the container into the chute 20 of the unit chosen, and so into a bait bucket or the like held at the mouth of the chute. Thus, since the minnows will be constantly immersed, said minnows will be protected against injury while being transferred from the dispensing unit into the bait bucket. By slowly swinging the arm 34 of the bell-crank of the unit downwardly, the container 22 of said unit may be adjustably rocked upwardly to discharge only some of the water in the bottom pan 23 of said container along with only some of the minnows in the container. Accordingly, by gently tilting the container upwardly either more, on the one hand, or less, on the other hand, the quantity of water discharged as well as the number of minnows discharged may in some degree be controlled. Upon the release of the arm 34 of the bell-crank of the unit 14 chosen, the container 22 of said unit will automatically return by gravity to normal position within said unit resting upon its stool 21, when the bottom pan 23 of said unit will again be filled with water from the tank 15 of the unit.

In connection with the return throw of the containers 22, it will be noted that the bottom walls of the bottom pans 23 of said containers are provided near the rear ends of said walls with a number of small openings 37 adapted to admit water into the pans and cause said pans to sink, so that the pans cannot act as pontoons to keep the containers afloat. However, the buoyancy of the bottom pans will, as the containers rock downwardly, tend to cushion the return throw of the containers.

The stools 21 are employed so as to permit the tanks 15 of the several units 14 to be relatively deep and so contain a relatively large quantity of water, while at the same time, the containers 22, in normally resting upon said stools, may be correspondingly shallow and of less over-all bulk to facilitate the manual operation thereof.

Having thus described my invention, I claim:

1. A bait minnow dispenser including a casing embodying a series of dispensing units each having a tank adapted to hold water, minnow containers having water and minnows therein disposed in said tanks and having waterdipping portions normally immersed in the water of the tanks, means pivotally mounting the containers upon the casing and supporting the containers to dip water from the tanks and pour out the dipped water when the containers are swung upwardly, and manually operable means mounted upon the casing and connected to said containers for individually swinging the containers upwardly and dispensing minnows from the containers in the water poured therefrom.

2. A bait minnow dispensing unit including a tank adapted to hold water and provided with a discharge opening, a minnow container having water and minnows therein disposed in said tank and having a water-dipping portion normally immersed in the water of the tank and provided with a discharge spout extending toward said opening, means extending between the spout and tank pivotally mounting the container upon the tank and supporting the container to dip water from the tank and pour the dipped water through said spout when the container is swung upwardly, and manually operable means pivoted upon the tank and connected to said container for swinging the container upwardly and dispensing minnows from the container through said opening in the water poured through said spout.

3. A bait minnow dispensing unit including a tank adapted to hold water, a minnow container having water and minnows therein disposed in said tank and provided with a bottom pan having a portion thereof normally immersed in the water of the tank and provided with a discharge spout extending above the normal level of water in the tank, means extending between the spout and tank pivotally mounting the container upon the tank and supporting the pan to dip water from the tank and pour the dipped water through said spout when the container is swung upwardly, and manually operable means pivoted upon the tank and connected to said container for swinging the container upwardly and dispensing minnows from the container in the water poured through said spout.

4. A bait minnow dispensing unit including a tank adapted to hold water, a minnow container having water and minnows therein disposed in said tank and provided with a bottom pan having a portion thereof normally immersed in the water of the tank and provided with a bottom wall inclined upwardly to one end of the container to form a discharge spout extending above the normal level of the water in the tank, lugs extending downwardly from the bottom wall of said spout, lugs extending from a wall of the tank and mating wtih the lugs of the spout, a hinge rod extending through said lugs pivotally mounting the container and supporting the pan to dip water from the tank and pour the dipped water through said spout when the container is swung upwardly, and manually operable means pivoted upon the tank and connected to said container for swinging the container upwardly and dispensing minnows from the container in the water poured through said spout.

5. A bait minnow dispensing unit including a tank adapted to hold water, a minnow container having water and minnows therein disposed in said tank and provided with a bottom pan having a portion thereof normally immersed in the water of the tank and provided with a discharge spout, means extending between the tank and said spout pivotally mounting the container and supporting the pan to dip water from the tank and pour the dipped water through said spout when the container is swung upwardly, and a bell-crank pivoted upon the tank and having a long arm connected to said container and a short arm projecting from the tank and manually operable for swinging the container upwardly and dispensing minnows from the container in the water poured through said spout.

6. A bait minnow dispensing unit including a tank adapted to hold water, a minnow container having water and minnows therein pivoted to the tank to swing therein and having a bottom pan normally immersed in the water of the tank, and manually operable means pivoted upon the tank and connected to the container for swinging the container upwardly to discharge minnows from said pan, the pan being movable as the container is swung upwardly to dip water from the tank for discharge along with the minnows.

7. A bait minnow dispensing unit including a tank adapted to hold water, a minnow container having water and minnows therein disposed in said tank and having a water-dipping portion normally immersed in the water of the tank, means pivotally mounting the container and supporting the container to dip water from the tank and pour out the dipped water when the container is swung upwardly, and means for swinging the container upwardly and dispensing minnows from the container in the water poured therefrom.

References Cited in the file of this patent

UNITED STATES PATENTS

| | | |
|---|---|---|
| 664,568 | Monger | Dec. 25, 1900 |
| 828,477 | Helmer | Aug. 14, 1906 |
| 1,295,508 | Hughes | Feb. 25, 1919 |
| 1,619,634 | Roat | Mar. 1, 1927 |
| 2,169,941 | Campbell | Aug. 15, 1939 |
| 2,587,899 | Rhodes | Mar. 4, 1952 |
| 2,594,474 | McGrath | Apr. 29, 1952 |